Aug. 17, 1954    E. R. NYLAND    2,686,681
DEVICE FOR HOLDING WORKPIECES
Filed June 3, 1950    4 Sheets-Sheet 1

INVENTOR.
Edward R. Nyland
BY
Barnes, Kisselle, Laughlin & Raisch
Attorneys.

INVENTOR.
Edward R. Nyland
BY
Attorneys.

Aug. 17, 1954     E. R. NYLAND     2,686,681
DEVICE FOR HOLDING WORKPIECES

Filed June 3, 1950     4 Sheets-Sheet 3

INVENTOR.
Edward R. Nyland
BY
Barnes, Kisselle, Laughlin & Raisch
Attorneys.

Aug. 17, 1954  E. R. NYLAND  2,686,681
DEVICE FOR HOLDING WORKPIECES
Filed June 3, 1950  4 Sheets-Sheet 4

INVENTOR.
Edward R. Nyland.
BY
Barnes, Kisselle, Laughlin & Raisch
Attorneys.

Patented Aug. 17, 1954

2,686,681

UNITED STATES PATENT OFFICE 2,686,681

DEVICE FOR HOLDING WORKPIECES

Edward R. Nyland, Detroit, Mich.

Application June 3, 1950, Serial No. 165,931

2 Claims. (Cl. 279—1)

This invention relates to a chuck or work holder for holding an object, such as a work piece, while mechanical operations are performed on the work piece, such as grinding, burring, turning, cutting gear teeth, lapping, polishing and the like.

Among the objects of the invention are the provision of a simple and novel device for effectively gripping and holding a work piece in a plane and/or on its axis, which device can be manufactured with facility and which requires a minimum of manipulating movement to engage and release the same. Further, the invention aims to provide a holder which will engage a work piece and hold the same against a locating surface, and a device which may be used in conjunction with another instrument for piloting or centering the work piece or which may itself serve to center the work piece.

To these ends the work holder embodies a flexible or elastic element in the nature of a cone diaphragm and more specifically, in the form of a ring in which the ring is of coned form so that its inner periphery and its outer periphery are spaced axially from each other. In conjunction with this element, the chuck or holder embodies means for applying axial pressure to the ring to cause it to flex to expand at its outer periphery thus to engage the internal surfaces of a work piece and/or to contract its inner peripheral edge thus to engage the external surface of a work piece. While the flexible element is generally of ring form, it need not be circular and it may be constructed to engage work pieces on a contour other than a circular contour, such as a square or hexagonal shape.

A further object of the invention is to provide a chuck or work holder which effectively grips work pieces with a minimum of parts or mechanism projecting beyond the surface of the work piece which is gripped. Thus, the work holder does not present parts or elements which may interfere with the tools to perform the work, and, accordingly, the working tools need not be retracted or moved any considerable distance from the work piece when the same is placed into or removed from the machine.

Other objects will become apparent as the following detailed description is considered in connection with the accompanying drawings.

Figures 1, 2, 3:
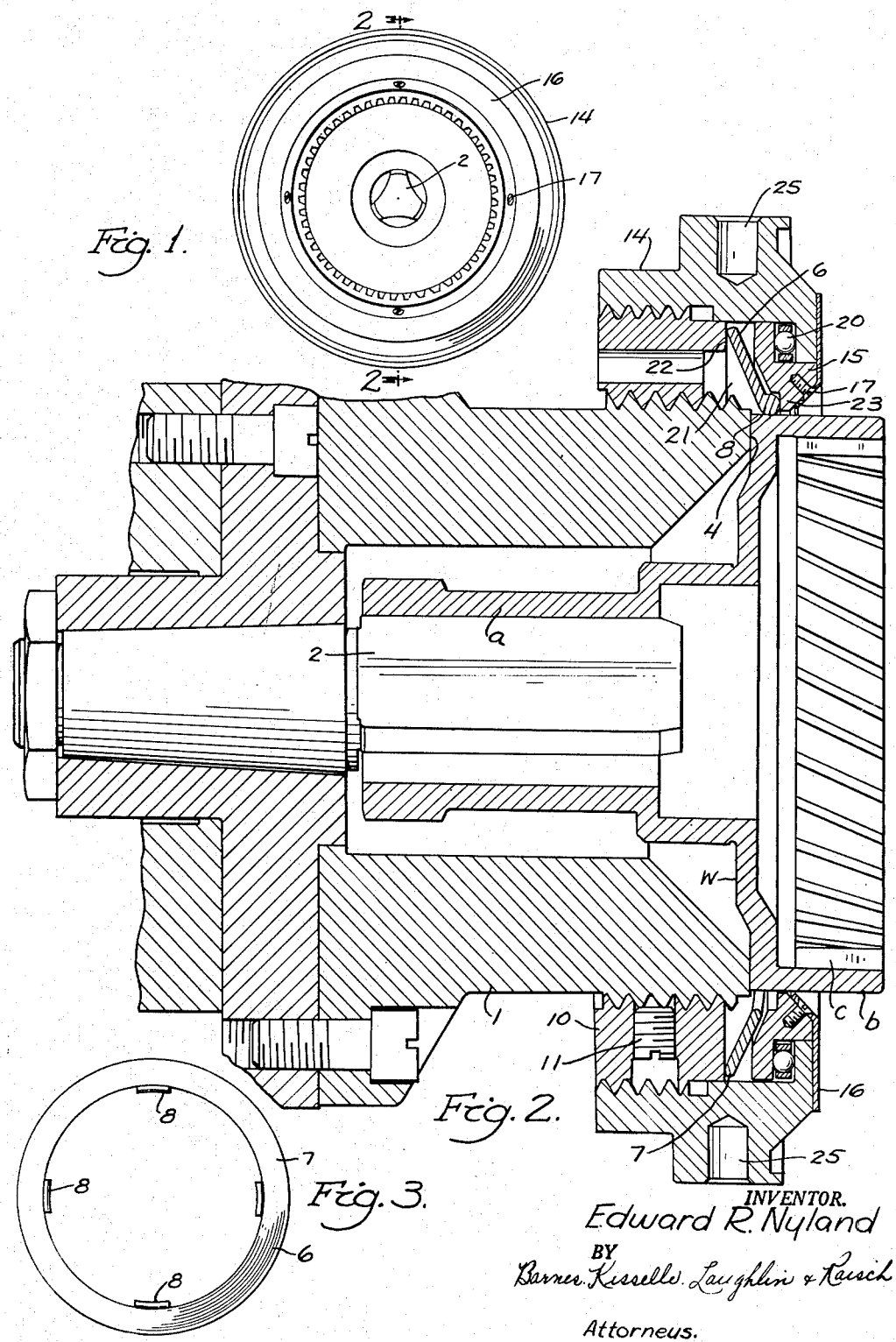
Fig. 1 is an end elevational view illustrating the holder with a work piece therein.
Fig. 2 is an enlarged cross sectional view taken substantially on line 2—2 of Fig. 1 showing a work piece held in position by the holder.
Fig. 3 is an ensmalled plan view of the gripping element.

In Fig. 2, the head of a machine tool, which may be rotatable, is illustrated generally at 1 and inasmuch as the head structures of such tools may vary in a large degree the details thereof are unimportant. The head shown has a pilot 2 for centering a work piece generally illustrated at W. This particular work piece has a hub portion *a* which fits over the pilot as indicated, the same fitting in a recess in the head 1, and a portion *b* of larger diameter which may be or which is to become an internal gear with internal teeth *c*. The work piece W is positioned as indicated and is to be located by being abutted against the locating or reference surface 4, and the work holder of the present invention, as shown in Fig. 2, is arranged to engage the exterior surface of the portion *b*.

The yieldable gripping element is generally indicated at 6 and as shown in Fig. 3, it is in the form of a ring and more particularly, as indicated with reference to Fig. 2, it is in the form of a dished or coned ring. The ring may have an unbroken outer periphery 7 and it may be formed with lands 8 on its inner periphery. As will be noted by reference to Fig. 2, the dished or coned construction of the ring, which may be considered as a partial diaphragm, results in that the outer periphery 7 and the inner periphery are spaced axially. The coned ring is of spring metal, such as steel; it is formed of stock which is relatively thin and has a radial dimension such that the thickness and width provide the desired yieldability.

Means are provided for holding the ring in assembly and for manipulating the same, and as shown in Fig. 2, this means comprises an element 10, which may be screw threaded on the head 1 so that it may be adjusted and it may be held in adjusted position by a set screw 11. An actuating element 14 is screw threaded onto the element 10 and the element 14 includes a pressure applying device 15 assembled with the member 14 by a plate 16 held by screws 17, there being advantageously an interposed anti-friction bearing indicated at 20. The combined elements provide a recess 21 in which the yieldable element is housed. The outer peripheral edge of the yieldable element is arranged to engage a surface 22 while the pressure element 15 is formed as at 23 for engaging the lands 8, or generally, the inner peripheral portion of the yieldable element. The member 14 is constructed so that it may receive a suitable turning tool for its rotation on the member 10 and for this purpose it may be equipped with a number of recesses 25 in which a turning tool may be inserted.

When the member 14 is shifted to the right relative to member 10, as Fig. 2 is viewed, the yieldable element is relieved and is loosely contained in its housing and a work piece may be slipped into the chuck, as shown in Fig. 2. It will be understood that the enlarged portion b of the work piece readily passes telescopingly into the yieldable ring and the work piece may be positioned by the surface 4. The element 14 is now turned on its threads to cause it to advance toward the left and the portion 23 engages the inner peripheral portion of the coned ring, and as the movement continues, the coned ring is compressed or partially collapsed thus causing a change in the diametral dimension of at least one peripheral portion and specifically a decrease in its internal diameter so that the lands 8 engage and grip the external surface portion b of the work piece. The outer periphery of the gripping element need not be centered inasmuch as the work piece is centered by the centering device 2. The amount of rotation given to the member 14 need be only a partial revolution, depending somewhat on the pitch of the threads, and the desires of the user, to the end that the work piece may be placed in the holder and gripped and released therefrom with a minimum of manipulating movement. Needless to say, to remove the work piece, the member 14 is rotated so that it is retracted to the right thus relieving the pressure on the gripping element so that the same expands and releases the work piece. Furthermore, when the work piece is so held any mechanical operation may be performed thereon.

Figure 4:
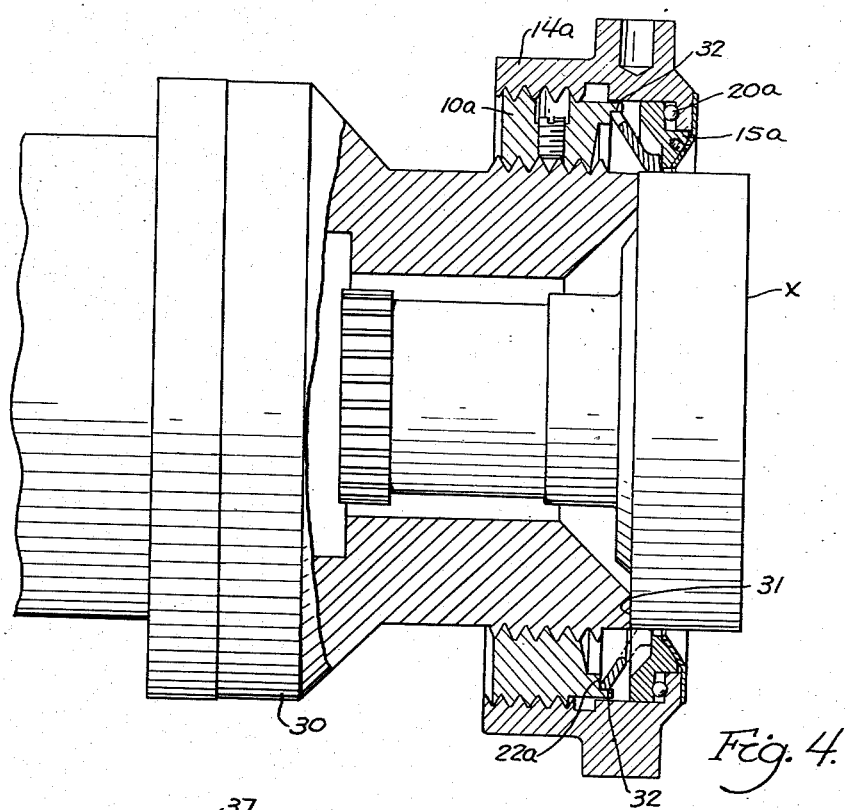
Fig. 4 is a cross sectional view illustrating a work piece held by the device without a separate element for centering the work piece.

In Fig. 4, there is shown a holder for holding a work piece without a separate centering device. The head of the machine is illustrated at 30, arranged to receive a work piece x, which may be abutted against the locating surface 31. The elements of the gripping device are largely the same as those shown in Fig. 2, and, therefore, to avoid unnecessary duplication of description, the same reference characters are applied in addition to the letter a. In this form the gripping element is arranged so that its outer peripheral portion not only engages the face 22a but is also centered by engaging the internal surface of an annular shoulder or lug 32 on member 10a. Accordingly, when the member 14a is tightened to partially collapse the gripping element, the gripping element itself is centered and piloted and it in turn centers and pilots the work piece by engaging the external surface thereof as indicated.

Figure 5:
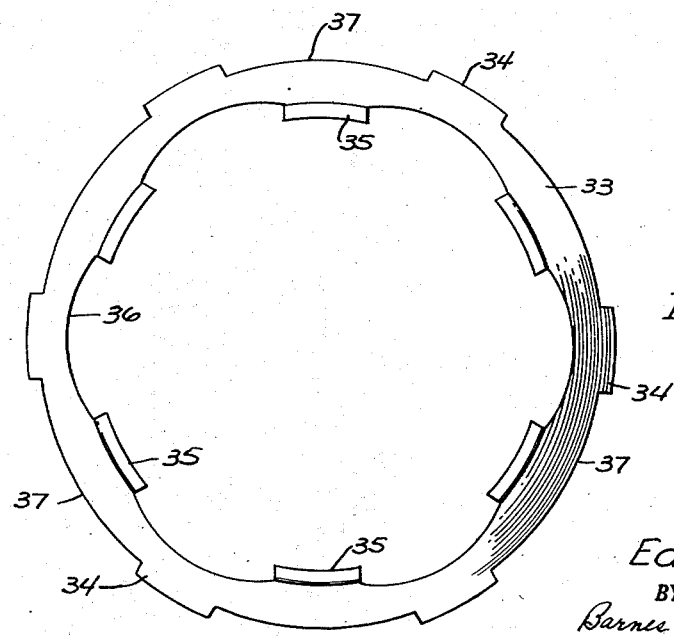
Fig. 5 is a plan view of a modified gripping element.

One form of gripping element is illustrated in Fig. 5, and such an element may be used in the construction shown in Fig. 4. The body of this element is indicated at 33 and it is provided with lands 34 on its outer peripheral surface and lands 35 on its inner peripheral surface. The flexibility or yieldability of the element may be determined by removal of some of the metal of the body as indicated by the scalloped or recessed portions 36 and by the removal of metal to form the inset peripheral portions 37 leaving the lands 34 projected therefrom. This, however, is subject to variation depending upon the class of work and perhaps the size and weight of the work piece. If the gripping element, as shown in Fig. 5, is used in the Fig. 4 arrangement, the several lands 34 seat in the corner at the intersection of the interfaces 22a and 32 and the lands 35 engage the exterior peripheral surface of the work piece. From this it can be easily seen that the surface of the work piece which is gripped need not be circular.

Figure 6:
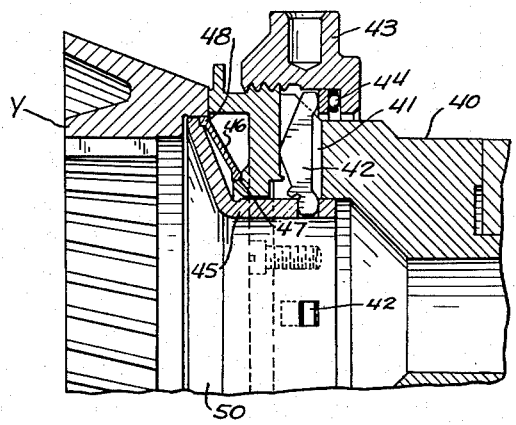
Fig. 6 is a cross sectional view showing a holder and a work piece and illustrating the work piece as being held from an internal surface thereof.

A form of device for engaging an internal face of the work piece is indicated in Fig. 6. Here the head of the machine tool is shown at 40 and it is slotted at several locations as shown at 41 for receiving levers 42. The adjusting member 43 engages the outer ends of the levers advantageously through the means of an anti-friction bearing 44 while the inner ends of the levers engage in recesses in a pressure applying member 45. The yieldable diaphragm is illustrated at 46. Its inner peripheral edge seats in the head as at 47 and its outer peripheral edge, as at 48, is arranged to lie within and engage the internal surface 50 of a work piece y. The particular work piece shown has an exterior surface which does not lend itself to being engaged or gripped. When the work piece is positioned, telescopingly relative to the coned ring 46, the member 43 is turned on its screw threads to advance it to the left as Fig. 6 is viewed. This action rocks the levers so that their inner ends draw the pressure member 45 to the right. This pressure member engages the outer peripheral portion or portions of the flexible gripping element and causes the same to expand to grip the surface 50. A reverse movement of the member 43 relieves the pressure and the flexible gripping element flexes back to its original size and the work piece may be removed.

Figure 7:
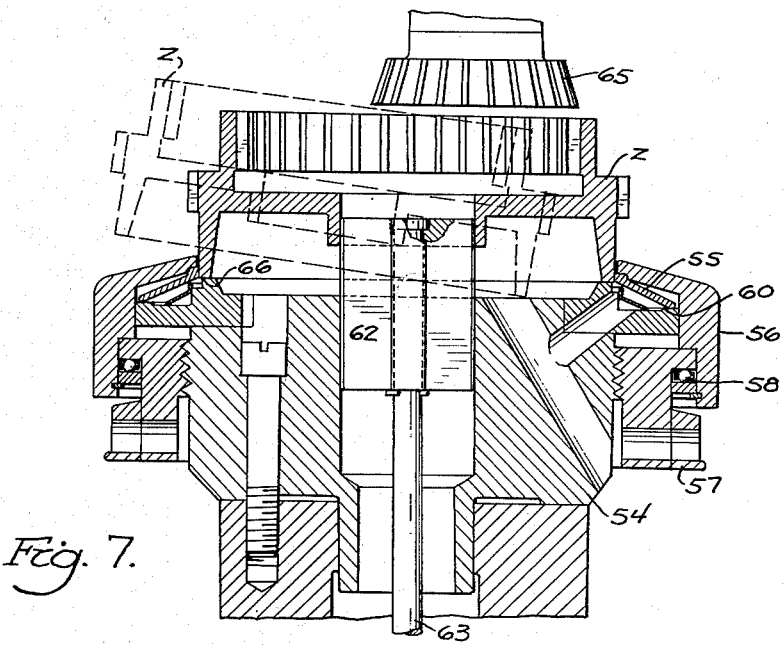
Fig. 7 is a cross sectional view showing a work piece in a holder and illustrating a work performing tool and demonstrating the slight clearances necessary to remove or insert the work piece.
Figure 8:
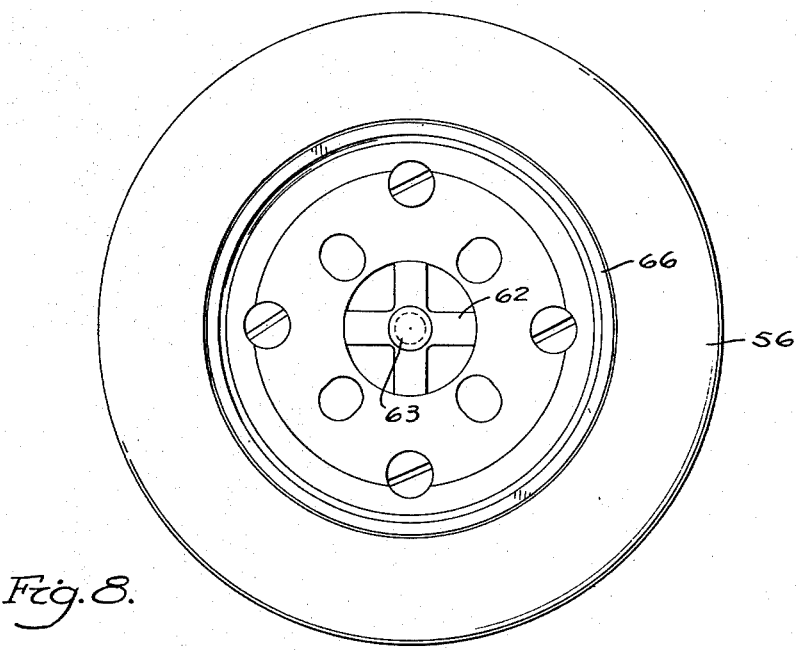
Fig. 8 is an elevational view of the tool shown in Fig. 7 illustrating the pilot.

The arrangement shown in Fig. 7 indicates the slight clearance between a work performing tool and the chuck for the insertion and removal of a work piece. This figure also indicates a modified arrangement for acting upon the gripping member. The head of the machine tool is illustrated at 54 and the yieldable gripping element is shown at 55. The pressure applying member at 56 may be drawn downwardly as Fig. 7 is viewed, by a movement of the member 57 on its threads, the same drawing the pressure member downwardly preferably through an anti-friction bearing 58. The outer peripheral portion of the gripping member seats on a surface 60 while the inner peripheral portion is designed to engage the external face of a work piece z. The work piece may be gripped or released substantially in the manner as above described. This view illustrates a centering device or pilot 62 which extends into and pilots the hub of the work piece as indicated when the work piece is in position. The pilot, however, may be retracted by means of a rod 63. A work performing tool is indicated at 65.

Now, it will be noted that the work is gripped by the coned ring very close to the point where the work piece seats on the surface 66 so that the major portion of the work piece is freely exposed for performance of mechanical operations thereon. When the work piece is to be removed, or another work piece inserted, the work performing tool 65 need not be retracted any considerable distance from the head 54. It may be retracted only to an extent as demonstrated in Fig. 7 and the work pieces may be inserted and removed by tipping the same somewhat angularly as indicated by the dotted line position. A work piece thus angularly positioned may be mounted in or removed from the head.

This arrangement speeds up the operation of the machine as a whole. Furthermore, the length of the reciprocal path of the work performing tool 65 may be shortened, and if the movement is accomplished by a crank, the crank may be at the top of the throw while in the position substantially as indicated in Fig. 7. Accordingly, when the tool 65 is advanced toward the work piece it engages the work piece near the top of the stroke of the crank at which time the advancing rate or speed of the tool is relatively slow, and there is a minimum of shock when the work performing tool comes into engagement with the work piece.

Figure 9:
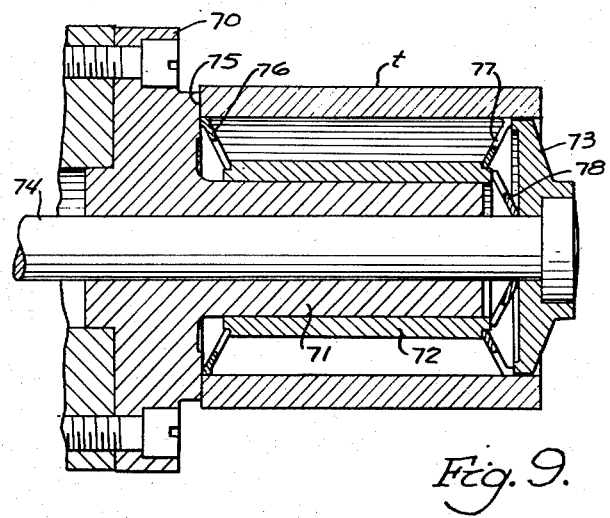
Fig. 9 is a cross sectional view illustrating a tandem arrangement for gripping a piece of work at axially spaced locations.

An arrangement is shown for holding a relatively long piece of work at axially spaced points in Fig. 9. The head is illustrated at 70 and it has a hub 71 for receiving a slidable sleeve 72 while a pressure applying device is indicated at 73 operable by a rod 74. The work piece is illustrated at $t$, arranged to be located by abutment against shoulder 75. There is a clamping element 76 for engaging the work piece at its inner end and a clamping element 77 for engaging the work piece at its opposite end and a similar coned ring or coned diaphragm 78 positioned between the end of the sleeve 72 and the pressure applying member 73. When the work is first positioned it slides over the members 76 and 77 and may be abutted against the shoulder 75 and the rod is then actuated by suitable means to shift the member 73 to the left.

In this action, the yieldable member 78 urges the sleeve 72 to the left and causes it to slide thus flexing the gripping member 76 causing it to grip the work. Advantageously the member 78 may be stiffer than the member 76 so that the gripping member 76 is the first one to flex and grip the work. In this action, the member 77 may not be flexed to any substantial extent because the sleeve 72 is shifted but as the member 76 increases its resistance to flexing then the member 78 will flex and the head 73 will move to the left relative to the sleeve thus flexing and expanding the member 77 to cause it to grip the work piece. The clamping element 76 has its inner periphery seated on the sleeve near one end therof while the gripping member 77 has its inner periphery seated on the sleeve near the opposite end thereof. The work piece is released by a reversal of the above operation.

Figure 10:
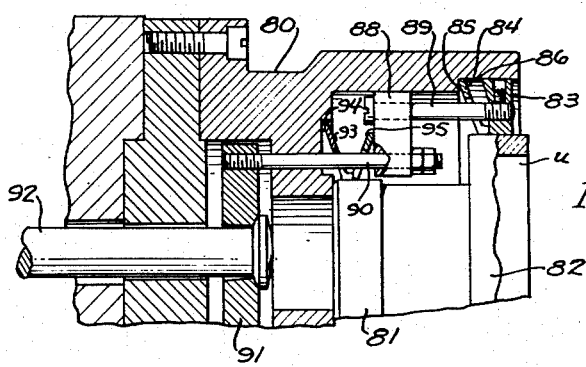
Fig. 10 is a view similar to Fig. 9 illustrating another arrangement for gripping a work piece at axially spaced locations.

In the arrangement shown in Fig. 10, the head 80 receives a work piece $u$ and the work piece is gripped on its surfaces 81 and 82 which are of different diameters. One pressure member 83 engages a coned ring 84. The outer periphery of the ring 84 engages in a corner at the intersection of a shoulder 85 and the inner peripheral surface 86 of the head. A second pressure member 88, which slides in the head, is connected to the pressure member 83 by rods 89, and this pressure member may be connected by rods 90 to a disc or plate 91 which may be actuated by a rod 92. A coned ring gripping device 93 has its outer periphery seated in a groove in the head as at 94 and its inner periphery is engaged by another coned flexible member 95.

The member 95 engages the member 93 at its inner periphery while its outer periphery engages the pressure member 88. To grip the work the rod 92 is shifted to the left as Fig. 10 is viewed, and through the rods above described, both pressure heads 83 and 88 are shifted to the left thus flexing both gripping devices 84 and 93 and causing them to respectively engage the surfaces 82 and 81 of the work piece. The coned spring element 95 may flex in this action and serves to insure the gripping of the work by both gripping elements. Inasmuch as both pressure applying members 83 and 88 are shifted uniformly, the arrangement is preferably such that the gripping element 93 grips the work in advance of the gripping element 84 and upon continued movement of the rod 92 to the left the element 95 flexes for continued flexing of the gripping device 84 until it grips the work on surface 82.

Figure 11:
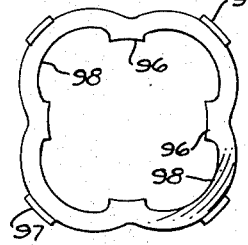
Fig. 11 is a plan view of a yieldable gripping element such as may be employed in the forms shown in Figs. 9 and 10.

In this form of device, the coned rings used may be formed in a manner similar to that shown in Fig. 11, wherein it has internal lands 96 and external lands 97 with recessed or scalloped portions 98 which permit the passage of the bolts or rods 89 and 90 therethrough.

In some of the claims appended hereto use is made of the term "telescopingly" in describing the relationship between a work piece and the gripping element. This is intended to cover the situation where the work piece fits within the gripping element and the situation where the gripping element fits within the work piece.

I claim:

1. A chuck or work holder for holding a work piece so that an operation may be performed thereon comprising, a ring shaped body of spring metal having an external peripheral edge and an internal peripheral edge, the body being so formed that the said external and internal edges are spaced from each other axially of the ring shaped body, said ring shaped body adapted to have a work piece slidably disposed telescopingly relative thereto, with a surface of the work piece adjacent one peripheral edge, compressing means for engaging the external peripheral edge of the body, compressing means for engaging the internal peripheral edge of the body, means for relatively moving the compressing means to thereby subject the ring shaped body to axial compression and cause the metal thereof to yield and change the diametral dimension of said one peripheral edge, whereby said one peripheral edge engages and grips the work piece.

2. A chuck or work holder for holding a work piece so that an operation may be performed thereon comprising, a ring shaped body of spring metal having an external peripheral edge and an internal peripheral edge, the body being so formed that the said external and internal edges are spaced from each other axially of the ring shaped body, said ring shaped body adapted to have a work piece slidably disposed telescopingly relative thereto, with a surface of the work piece adjacent one peripheral edge, compressing means for engaging the external peripheral edge of the body, compressing means for engaging the internal peripheral edge of the body, said compressing means having substantially radially disposed engaging surfaces and the said peripheral edges being adapted to be engaged by said surfaces, means for relatively moving the compressing means to thereby subject the ring shaped body to axial compression and cause the metal thereof to yield and change the diametral dimension of said one peripheral edge, whereby said one peripheral edge engages and grips the work piece.

References Cited in the file of this patent

UNITED STATES PATENTS

| Number | Name | Date |
|---|---|---|
| 261,887 | Whitney | Aug. 1, 1882 |
| 1,263,081 | Letzing | Apr. 16, 1918 |
| 1,330,998 | Bolender | Feb. 17, 1920 |
| 1,414,460 | Dixon | May 2, 1922 |
| 1,470,158 | Garrison | Oct. 9, 1923 |
| 1,725,342 | Copland | Aug. 20, 1929 |
| 2,267,130 | Paulson | Dec. 23, 1941 |
| 2,443,895 | Day | June 22, 1948 |